Patented Aug. 11, 1931

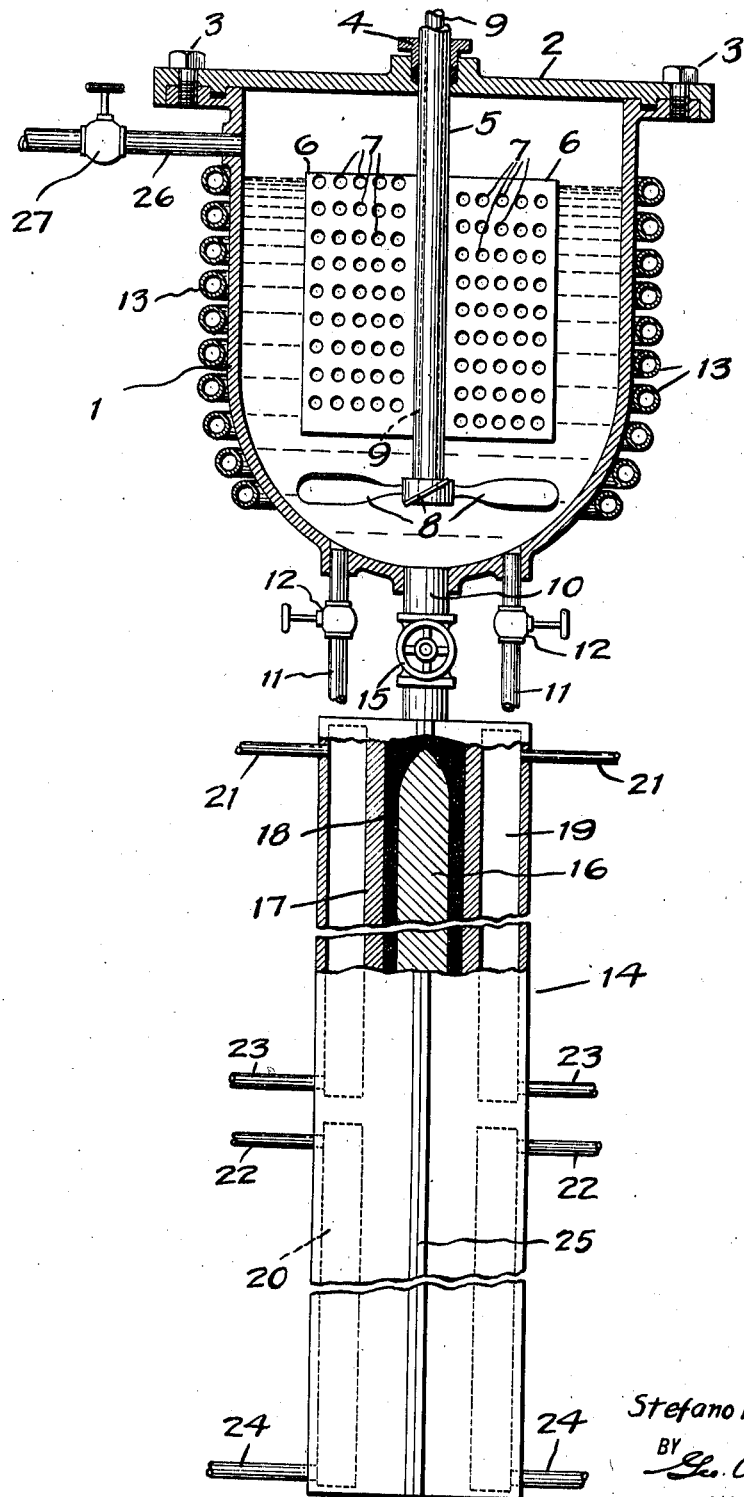

1,818,372

UNITED STATES PATENT OFFICE

STEFANO BATTILANI, OF NEW YORK, N. Y.

APPARATUS FOR PRODUCING RUBBER HAVING AIR CELLS

Application filed September 28, 1926. Serial No. 138,154.

The invention relates to an apparatus for producing rubber having air cells therein at more than atmospheric pressure.

The product might be used for inner tubes of automobile tires, life preservers, cushions or numerous other things.

The process of producing rubber sponge or sponge rubber by adding to a rubber mixture a chemical that will produce a gas at the vulcanizing pressure is well known. In general practice after the gas cells have been formed they are broken down and the result is porous rubber sponge. If the gas cells are not broken down the gas would soon escape by penetrating the rubber and the cells would collapse.

Air when confined by a rubber compound will not escape for a great length of time. It is the object of the present invention to produce a rubber compound impregnated with a great number of air cells containing air at more than atmospheric pressure. The invention contemplates confining a mass of raw rubber or a substitute material for rubber in an air tight container, heating the same to a liquid state and then subjecting it to the action of compressed air while it is being agitated by suitable mechanism. The mixture containing air cells having air therein at more than atmospheric pressure is then forced into suitable forms or molds. Naturally after the finished article has been released from the mold the air which is confined in the numerous cells will tend to expand and resume its normal pressure. The amount of this expansion will be governed by various conditions such as the amount of compressed air originally forced into the mixture and the composition of the rubber that is used in the mixture.

In the drawing there is illustrated a form of apparatus that may be successfully used in supporting the process but it is to be understood that the process is one that is susceptable of being carried into use by other apparatus than that disclosed in the drawing forming part of the present application.

In the drawing the figure represents a sectional view, with parts broken out and parts in elevation, of the apparatus.

The reference numeral 1 indicates an air tight container. The container is provided with a removable cover 2 secured thereto by bolts or other suitable means 3 so as to insure a sealed connection between the container and its closure. Instead of removing the entire cover to place the material in the container an opening, suitably closed might be provided in the cover.

There is a stuffing box 4 in the cover and through this stuffing box passes the hollow shaft 5 of an agitator or mixer. This agitator or mixer consists in part of a plurality of plates 6 which have rows of perforations 7. These rows of perforations are arranged in horizontal planes on the plates, the rows being staggered in relation to each other on the adjacent plates, thus insuring a thorough mixing of the contents of the container when the shaft 5 is rotated. To insure a more complete mixing a series of curved blades 8, in the form of a propeller is secured to the lower part of a shaft 9 which passes through the hollow shaft 5. The hollow shaft 5 and the shaft 9 may be rotated simultaneously when it is desired to mix the contents of the container. When the shaft 9 is rotated in one direction the propeller 8 will tend to force the contents of the container upward and over the plates 6. When it is turned in the opposite direction the tendency will be to aid in ejecting the contents of the container through the outlet 10. While the contents of the container are being ejected it is preferable that the shaft 5 be held stationary. It is not thought necessary to illustrate the driving mechanism for the shafts 5 and 9.

A plurality of pipes 11 are provided for admitting compressed air in the lower part of the container and forcing the air through the mixture while it is being agitated. These pipes 11 have suitable valves 12 for controlling the compressed air.

Means are provided for heating the container so as to reduce the viscosity of the contents. This might be accomplished in numerous different ways and for purpose of illustrating a coil 13 is shown for the heating agent. Instead of the coil 13 the container 1 might be jacketed or any well known method may be utilized for supplying heat to the container. After the contents of the container have been exhausted and before refilling it, it may be desirable to run a cooling agent through the coil 13.

After the contents of the container have been sufficiently agitated under the required air pressure they are expelled from the container through the outlet 10, previously mentioned, into a suitable mold 14. A valve 15 in the outlet 10 may be opened when it is desired to eject the contents or any part thereof.

The mold 14 may be of any desired form and construction. As illustrated a central core or mandril 16 is provided and an outer casing or mold proper 17. With a mold of this form a rubber tube 18 may be made and it might be used for an inner tube for a tire, a life preserver or other things. Jackets 19 and 20 are shown surrounding the mold. These jackets 19 and 20 are supplied with heating or cooling agents through pipes 21 and 22. In order to provide for a circulation of the heating or cooling elements in the jackets 19 and 20 outlet pipes 23 and 24 are indicated. If it were desired to run the material through the mold continuously a heating agent might be applied in the jacket 18 and a cooling agent in the jacket 19. The material would then emerge from the end of the mold in its finished state.

As indicated at 25 the mold might be split. Under certain conditions and for certain products it might be advantageous to fill the mold and after it has cooled take the mold apart and extract the core or mandril. If this were done a heating element would be run into both jackets 19 and 20 while the mold was being filled. After a sufficient amount of material had been placed in the mold the cooling agent or medium would then be run into the jackets 19 and 20.

As previously explained the propeller 8 when rotated in the proper direction at the proper time will assist in expelling the contents of the container into the outlet pipe and mold. In order to insure the contents being ejected a pipe 26 having a valve 27 is provided in the upper part of the container. Compressed air is admitted into the container through this pipe at a sufficient pressure to force the contents of the container through the outlet.

A vulcanizing agent or accelerator may be added to the contents of the container in any desired quantiy depending upon the results required and at any time during the process, or the vulcanization may take place after the material has left the main container 1.

Instead of bringing the contents of the container to a liquid state by heat they may be dissolved by suitable chemicals and in this way it would be possible to have the material vulcanized in a cold state.

The operation is as follows: The container 1 is filled or partially filled with raw rubber or a substitute in any desired form and the cover is placed in position so as to insure a sealed connection between it and the container. The heating agent is allowed to enter the coils 13 and the contents of the container are brought to a liquid state. The shafts 5 and 9 are then rotated turning the blades 6 and the propeller 8 and thus thoroughly agitating the mixture. At approximately the same time as the shafts 5 and 9 are placed in operation the valves 12 in the compressed air lines are opened. The valves 12 are left open until a sufficient air pressure has been built up in the container. During this time the valves 27 and 15 are closed. The result of the material being violently agitated while being subjected to the high atmospheric pressure is that innumerable bubbles or cells of compressed air are trapped in the mixture. The number of cells will depend largely upon the amount of air admitted and the violence of the agitation. After the contents have been mixed long enough to insure a sufficient number of air cells being trapped in the mixture the shaft 5 may be stopped. The shaft 9 is turned in the opposite direction or in the proper direction to help eject the contents and the valve 15 in the outlet 10 and valve 27 in the compressed air line 26 are opened. The contents of the container or a part thereof are then forced into the mold which as previously stated may be of any desired shape according to the article that is sought to be manufactuerd.

Numerous changes might be made in details without departing from the scope of the invention as set forth in the appended claim.

What I claim as new is:

An apparatus for producing rubber impregnated with cells containing air at more that atmospheric pressure, comprising an air tight container, valved pipes for admitting compressed air, means for bringing the contents of the container to a liquid state, perforated baffles for agitating the mixture while the compressed air is being admitted, and means for forcing the mixture from the container.

In testimony whereof I affix my signature.

STEFANO BATTILANI.